United States Patent [19]
Goodale

[11] 3,738,258
[45] June 12, 1973

[54] APPARATUS FOR TRIMMING THE ENDS OFF VEGETABLES

[76] Inventor: Richard J. Goodale, P.O. Box 268, Watsonville, Calif. 95076

[22] Filed: Sept. 17, 1971

[21] Appl. No.: 181,323

[52] U.S. Cl. .................. 99/643, 83/404, 83/732, 83/409.1, 83/419, 83/425.2
[51] Int. Cl. ............................................ A23n 15/04
[58] Field of Search ................ 146/81 R, 84, 86 R; 99/643; 83/404, 732, 409.1, 419, 425.2

[56] References Cited
UNITED STATES PATENTS

| | | | |
|---|---|---|---|
| 1,098,398 | 6/1914 | Phinney | 146/86 R |
| 3,339,603 | 9/1967 | Dall'Argine | 146/81 R X |
| 2,580,599 | 1/1952 | Rogers | 146/84 X |

Primary Examiner—Willie G. Abercrombie
Attorney—Allen & Chromy

[57] ABSTRACT

An apparatus for trimming the ends off of vegetables such as carrots, parsnips, zucchini and the like, This apparatus employs an endless conveyor provided with trays for receiving the vegetables. The trays are attached to the conveyor by pivoting means and extend transversely to the direction of travel of the conveyor. Spaced rails are provided for holding the trays in horizontal position while they pass through the loading station at which the vegetables are placed thereon. The trays are then moved through two end trimming zones. In the first zone the guide rails tilt the trays in one direction so that the vegetables slide downward in the trays toward a cutting knife which cuts off the lower ends of the vegetables as they are moved forward. When the trays are moved into the second trimming zone the guide rails tilt the trays in the opposite direction so that the vegetables slide downward in this direction toward a cutting knife which cuts off the other ends of the vegetables. Vibrating means is provided for shaking the trays while they are passing through the trimming zones so that the vegetables slide downward in the trays toward the cutting means.

1 Claim, 5 Drawing Figures

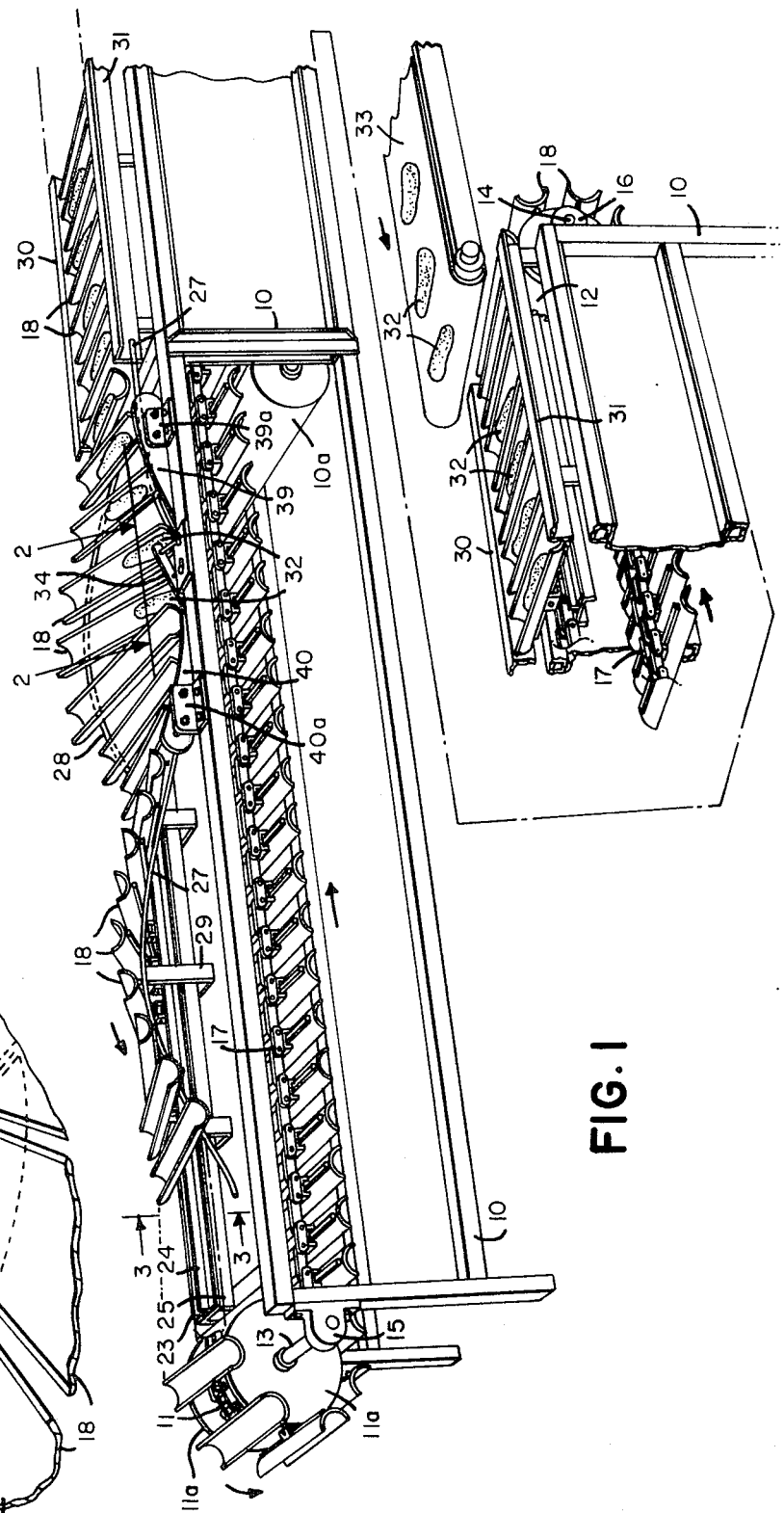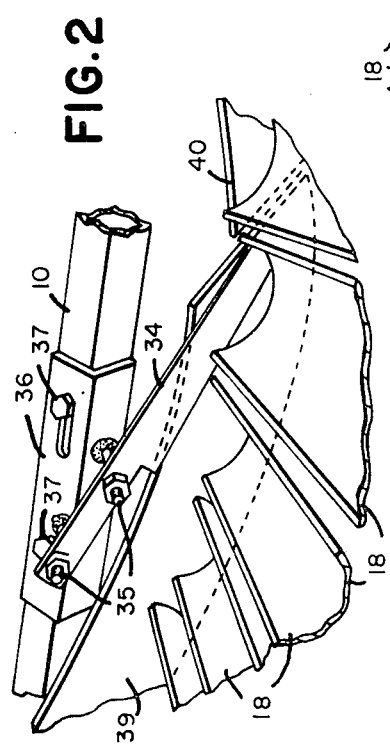

APPARATUS FOR TRIMMING THE ENDS OFF VEGETABLES

DESCRIPTION OF THE INVENTION

This invention relates to an apparatus for trimming both the top and bottom ends of vegetables such as carrots, parsnips, zucchini and the like.

An object of this invention is to provide an improved apparatus for trimming the top and bottom ends off of vegetables in an economical and reliable manner.

Another object of this invention is to provide an improved apparatus for trimming vegetables, said apparatus being provided with a plurality of vegetable-carrying trays which are first tilted in one direction and then in the other to trim the opposite ends of the vegetables.

Still another object of this invention is to provide an improved vegetable trimming apparatus in which the vegetables are placed on trays that are tilted and vibrated when they pass through the trimming zones so that the vegetables slide downward in the trays into the trimming apparatus.

Other and further objects of this invention will be apparent to those skilled in the art to which it relates from the following specification, claims and drawing.

In accordance with this invention there is provided an improved vegetable trimming apparatus that is economical to manufacture and reliable in operation. This apparatus is provided with an endless conveyor and a plurality of trays that extend across the conveyor and are pivotally attached thereto. Spaced guide rails are provided to the apparatus for holding the trays in substantially horizontal positions while the vegetables are being placed thereon. The apparatus is provided with two trimming zones in which the ends of the vegetables are trimmed. The guide rails are shaped so that the trays are tilted first in one direction and then in the other direction as they are passing through the trimming zones. Thus, the vegetables slide downward in the trays toward the knife in the first trimming zone and one end thereof is trimmed therefrom. After the vegetables are moved through the first trimming zone the trays are tilted in the opposite direction while the vegetables are carried through the second trimming zone in which the other end is trimmed from each vegetable. The trimming zones are provided with means for shaking the trays as they pass through these zones so that the vegetables slide downward in the tilted trays and the ends of the vegetables engage the fixed trimming devices which are supported by the frame of the apparatus adjacent to the ends of the tilted trays.

Further details and features of this invention will be set forth in the following specification, claims and drawing in which, briefly:

FIG. 1 is a side view partially broken away showing an embodiment of this apparatus;

FIG. 2 is a detail view taken along the line 2—2 of FIG. 1 showing the knife employed in each of the trimming zones;

Figure 4:
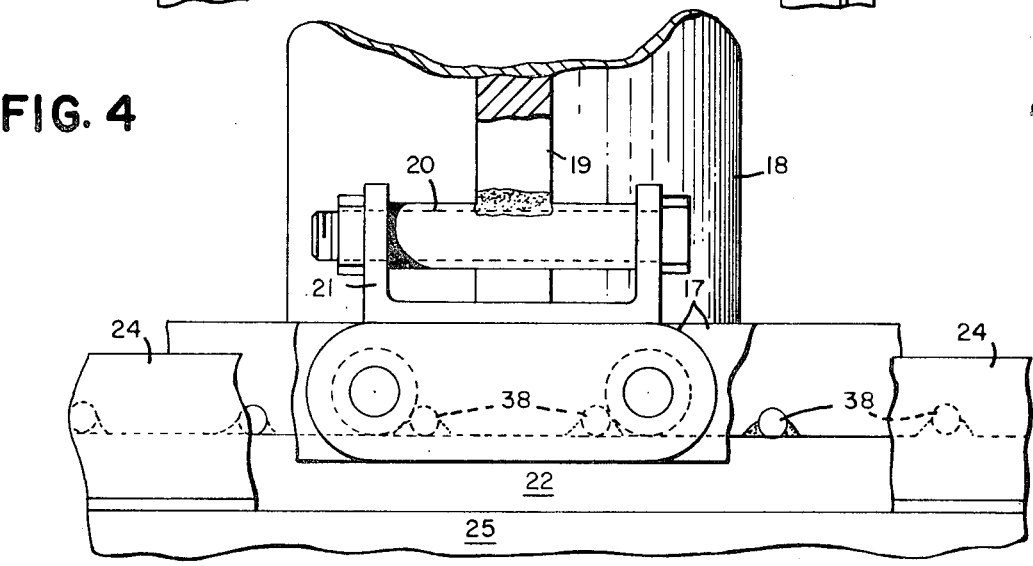
FIG. 4 is a sectional view taken along the line 4—4 of FIG. 3 showing the means for shaking the tilted tray as it passes through the trimming zone.

Referring to the drawing in detail reference numeral 10 designates the frame of this apparatus which is made of a plurality of structural members welded together. Sprockets 11 and 12 are provided to this apparatus and these sprockets are supported by shafts 13 and 14, respectively, in bearings 15 and 16 that are attached to the end structural members of the frame. An endless conveyor 17 is carried around the sprockets 11 and 12 and one of these sprockets is driven by an electric motor (not shown) for moving the conveyor. Trays 18 which may be made of plastic, metal, wood or the like, are pivotally attached to the conveyor 17 at spaced points. Each of the trays 18 is attached to a rib 19 that is of substantially the same length as the tray. Each rib 19 is attached by welding or the like to a pivoting member 20 as shown in FIG. 4. The ends of the pivoting member 20 are journaled in the U-shaped member 21 as shown in this figure. Each U-shaped member 21 is attached to a link of the conveyor 17.

As the conveyor 17 is moved between the sprockets 11 and 12 the upper part thereof is supported on a substantially square member 22 that is positioned between the angle iron members 23 and 24. The bottom part of the conveyor is kept from sagging excessively by the roller 10a which is rotatably supported by the frame. Members 22, 23 and 24 are attached to the top of the inverted channel iron member 25 that is attached to cross members of the frame 10 by welding or the like. Guide rails 26 and 27 engaging the end portions of the rails 19 are attached to the structural members of the frame 10 by brackets 28 and 29, respectively, which are welded thereto and to the frame. These guide rails 26 and 27 need to be provided only in the tilting trimming zones in which the vegetable-carrying trays 18 are tilted, first in one direction and then in the other as shown in FIG. 1.

In the right hand end of the apparatus which is the loading zone, the trays 18 are substantially horizontal and pass between the angle members 30 and 31. At the right hand end of the apparatus vegetables 32 are supplied thereto by the conveyor 33. The feeding conveyor 33 may be of the V-shape type providing a single file of vegetables to the trays 18 after they pass upward over the sprocket 12 under the conveyor. The trimming zones are located on opposite sides of the apparatus and at these zones the trays 18 are tilted by the guide rails 26 and 27 first in one direction and then in the other. At each zone there is provided a trimming knife such as the knife 34 shown in FIG. 2. This knife is attached by bolts 35 to the member 36 which is attached by bolts 37 to the frame 10.

Figure 5:
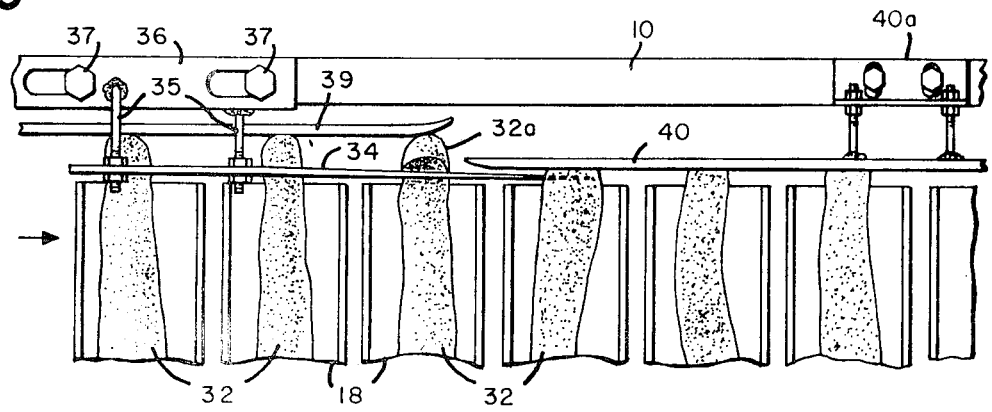
FIG. 5 is a top view partially broken away of one of the trimming zones.

When the trays 18 are moved by the conveyor 17 through the trimming zones these trays are vibrated up and down by the ribs 38 that are welded across the top of the member 22 at spaced points as shown in FIG. 4. This provides a shaking action to the trays and causes the vegetables 32 to slide down in the trays until the lower ends thereof abut the plate 39 which is supported by the frame 10 by bracket 39a. Thus as the conveyor moves the trays 18 in the direction indicated by the arrows the ends 32a of the vegetables 32 are severed therefrom as shown in FIG. 5. Thereafter, as the conveyor moves forward the cut ends of the vegetables engage the plate 40 which is supported by bracket 40a. The brackets 39a and 40a supporting the plates 39 and 40 on the frame are adjustable with respect to the ends of the trays. Thus by adjusting the plate 39 the amount of the end portion of the vegetables that is to be cut off can be adjusted.

As the conveyor continues the forward motion the trays 18 are tilted in the opposite direction by the guide rails 26 and 27 so that the vegetables slide downward in the trays 18 in the opposite direction and the other ends of the vegetables are presented to the cutting knife in the second trimming zone. The second trimming zone is also provided with the trimming knife such as knife 34 and guide plates such as plates 39 and 40 which engage the end of the vegetable prior to an after trimming respectively in the same manner as in the first trimming zone. The second trimming zone is also provided with tray vibrating or shaking means such as the rods 38 shown in FIG. 4. The rods 38 are welded transversely across the member 22 at predetermined spacings and the welds provide inclined sides over which the conveyor links slide as the tray supporting means is moved thereacross and vibrating or shaking action is provided to the trays.

Figure 3:
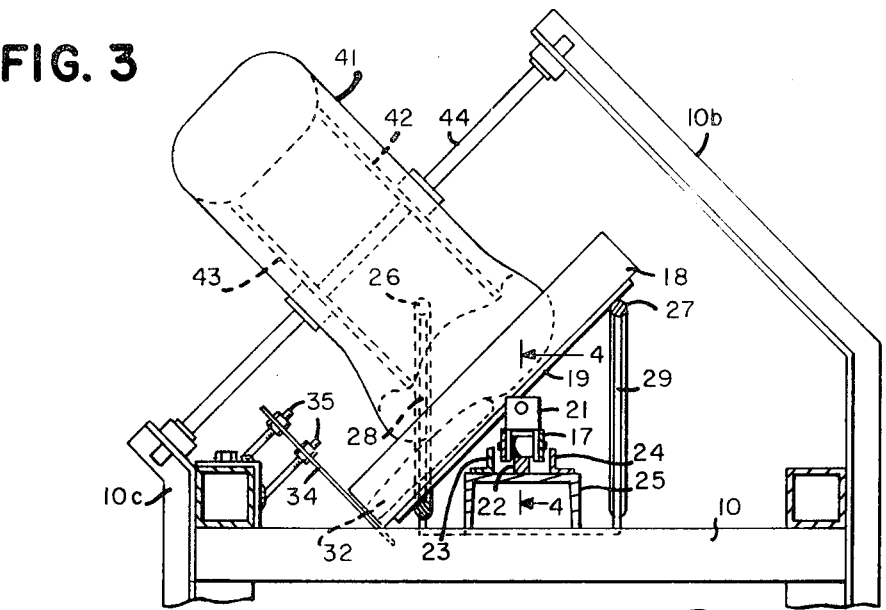
FIG. 3 is a view taken along the line 3—3 of FIG. 1 showing the second trimming zone.

Flexible rotatable members 41 of rubber, or the like, are provided at each of the trimming zones as shown in FIG. 3 for applying light pressure on the top of the vegetable while the vegetable is being trimmed by the knife. The rubber member 41 is similar to an inner tube of an automobile tire inflated with air. It is attached to discs 42 by suitable cement and the discs are attached to the shaft 44 which is rotatably supported by the frame members 10b and 10c.

The trimmed vegetables are dumped from the trays 18 as these trays pass over the sprocket 11 and the tray guiding discs 11a that are attached to the shaft 13 on the opposite sides of the sprocket 11.

While I have shown and described a preferred form of the invention, it will be apparent that the invention is capable of variation and modification from the form shown so that the scope thereof should be limited only by the proper scope of the claims appended hereto.

I claim:

1. In an apparatus for trimming the opposite ends off vegetables such as carrots, parsnips, zucchinni, and the like, the combination of a frame, a conveyor, said frame having means supporting said conveyor, means moving said conveyor, a plurality of vegetable carrying trays, means pivotally attaching said trays to said conveyor at spaced points, a first trimming zone and a second trimming zone, said trimming zones positioned on opposite sides of said conveyor, means tilting said trays in one direction as said trays are moved through said first trimming zone so that the vegetables slide down said tilted trays, means engaging the lower ends of the vegetables in said tilted trays limiting the downward slide of said vegetables, means trimming said lower ends of said vegetables while they engage said limiting means, means titling said trays as they are moved through said second trimming zone so that the other ends of the vegetables in said trays are lowermost, means engaging said other ends of the vegetables in the titled trays limiting the downward slide thereof in said second zone and means in said second zone trimming said other ends of said vegetables, said conveyor supporting means comprising a member attached to said frame, said conveyor slidably engaging said member, cross members attached to the top of said member at spaced points wherein the conveyor, upon engaging said cross members, moves up and down resulting in bouncing of said trays while they are moved through said first and second trimming zones whereby downward sliding of said vegetables in the tilted trays is facilitated.

* * * * *